United States Patent
Bashawaty et al.

(10) Patent No.: US 9,771,132 B1
(45) Date of Patent: Sep. 26, 2017

(54) FLOATING APPARATUS FOR SUPPORTING A GRILL

(71) Applicants: Michael Bashawaty, Livonia, MI (US); Jeremy Quillico, Livonia, MI (US)

(72) Inventors: Michael Bashawaty, Livonia, MI (US); Jeremy Quillico, Livonia, MI (US)

( * ) Notice: Subject to any disclaimer, the term of this patent is extended or adjusted under 35 U.S.C. 154(b) by 0 days.

(21) Appl. No.: 15/181,264

(22) Filed: Jun. 13, 2016

(51) Int. Cl.
*B63B 35/73* (2006.01)
*B63B 35/58* (2006.01)
*B63B 35/613* (2006.01)
*B63B 35/607* (2006.01)
*A47J 37/07* (2006.01)

(52) U.S. Cl.
CPC .......... *B63B 35/73* (2013.01); *A47J 37/0786* (2013.01); *B63B 2035/737* (2013.01)

(58) Field of Classification Search
CPC ... B63B 35/73; B63B 35/58; B63B 2035/737; B63B 35/613; B63B 35/607; A47J 37/0786
See application file for complete search history.

(56) References Cited

U.S. PATENT DOCUMENTS

| | | | |
|---|---|---|---|
| 3,015,406 A | 1/1962 | Nolte | |
| 3,032,783 A * | 5/1962 | Swanson, Jr. | A47J 37/0786 114/364 |
| 4,729,535 A | 3/1988 | Frazier et al. | |
| 5,251,113 A * | 10/1993 | Wagoner | A01K 79/02 362/190 |
| D469,317 S | 1/2003 | Doerr | |
| 7,867,049 B1 * | 1/2011 | Doffay | B63B 35/34 114/345 |
| 8,210,887 B2 * | 7/2012 | Dixon | B63B 1/04 441/13 |
| 8,702,461 B1 * | 4/2014 | d'Offay | B63B 7/082 114/345 |
| 8,915,010 B1 * | 12/2014 | Gardner | A01K 97/02 220/560 |
| 2006/0032422 A1 * | 2/2006 | McDermott | B63B 25/00 114/256 |

* cited by examiner

*Primary Examiner* — Anthony Wiest
(74) *Attorney, Agent, or Firm* — Stevenson IP, LLC

(57) ABSTRACT

A floating apparatus for supporting a grill including a substantially rectangular float having an outer rim, a substantially rectangular base disposed within the outer rim, and a cavity disposed within the outer rim above the base. Each of a right grill support and a left grill support of a pair of grill supports has a linear base rod and an upper support attached to a top surface of the base rod. The base rod of each of the right grill support and the left grill support is disposed within the cavity. A plurality of magnets is disposed within a middle segment of the upper support of each of the right grill support and the left grill support. At least one cup holder unit is disposed within the cavity of the float. A portable outdoor grill is removably securable to the plurality of magnets.

3 Claims, 3 Drawing Sheets

US 9,771,132 B1

FLOATING APPARATUS FOR SUPPORTING A GRILL

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of grill support apparatuses are known in the prior art. However, what has been needed is a floating apparatus for supporting a grill including a substantially rectangular float having an outer rim, a substantially rectangular base disposed within the outer rim, and a cavity disposed within the outer rim above the base. What has been further needed is for each of a right grill support and a left grill support of a pair of grill supports to have a linear base rod and an upper support attached to a top surface of the base rod. The base rod of each of the right grill support and the left grill support is disposed within the cavity. Lastly, what has been needed is a plurality of magnets disposed within a middle segment of the upper support of each of the right grill support and the left grill support, and at least one cup holder unit disposed within the cavity of the float. A portable outdoor grill is removably securable to the plurality of magnets. The floating apparatus for supporting a grill thus allows a user to grill while conveniently remaining in a body of water. Although the apparatus is best structured for use in sandbars, lazy rivers, and pools, as a result of the float and durable pair of grill supports, the apparatus can be used to support a grill in nearly any body of water.

FIELD OF THE INVENTION

The present invention relates to grill support apparatuses, and more particularly, to a floating apparatus for supporting a grill.

SUMMARY OF THE INVENTION

The general purpose of the present floating apparatus for supporting a grill, described subsequently in greater detail, is to provide a floating apparatus for supporting a grill which has many novel features that result in a floating apparatus for supporting a grill which is not anticipated, rendered obvious, suggested, or even implied by prior art, either alone or in combination thereof.

To accomplish this, the present floating apparatus for supporting a grill includes a substantially rectangular float, composed of a buoyant material, having a continuous tubular outer rim, a substantially rectangular base continuously disposed within the outer rim, and a cavity disposed within the outer rim above the base. The outer rim has a front right corner portion, a front left corner portion, a back right corner portion, a back left corner portion, a front portion, a back portion, a right portion, and a left portion. A pair of grill supports, optionally steel, includes a right grill support and a left grill support, with each of the right grill support and the left grill support having a linear base rod and an inverted substantially U-shaped upper support medially attached to a top surface of the base rod. The base rod of each of the right grill support and the left grill support is continuously disposed within the cavity from the front portion of the float to the back portion of the float proximal the right portion and the left portion, respectively. The upper support of each of the right grill support and the left grill support has a pair of end segments and a middle segment, with each of the pair of end segments downwardly and diagonally extended from the middle segment.

The floating apparatus for supporting a grill further includes a plurality of magnets disposed within the middle segment of the upper support of each of the right grill support and the left grill support. Additionally, at least one cup holder unit has a substantially square platform disposed within the cavity of the float and attached to at least one of the front right corner portion, the front left corner portion, the back right corner portion, and the back left corner portion, as well as a cup holder opening substantially medially disposed within the platform. The at least one cup holder unit is optionally a pair of cup holder units including a front cup holder unit and a back cup holder unit. The front cup holder unit is disposed within the cavity of the float and attached to the front left corner portion, and the back cup holder unit is disposed within the cavity of the float and attached to the back left corner portion.

A flattened bottom side of a portable outdoor grill is removably securable to the plurality of magnets and removably disposed immediately atop the upper support of each of the right grill support and the left grill support.

Thus has been broadly outlined the more important features of the present floating apparatus for supporting a grill so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
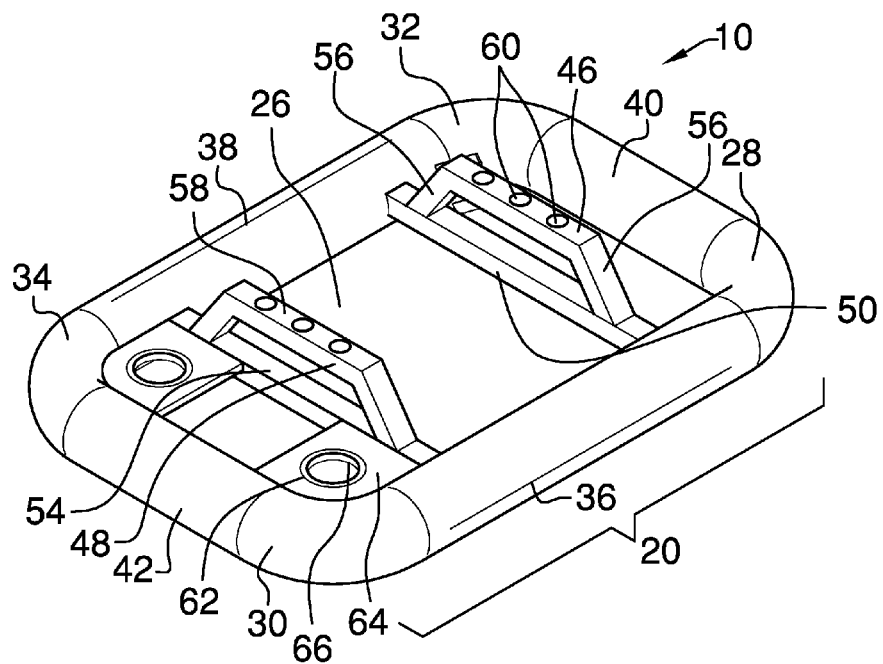
FIG. 1 is a front isometric view.
Figure 2:
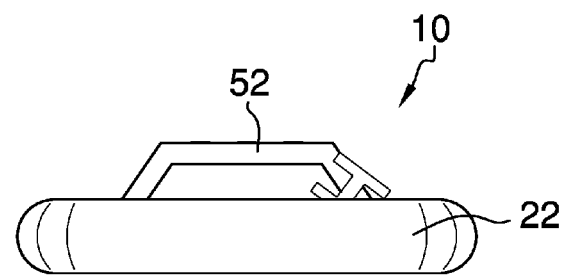
FIG. 2 is a side elevation view.
Figure 3:
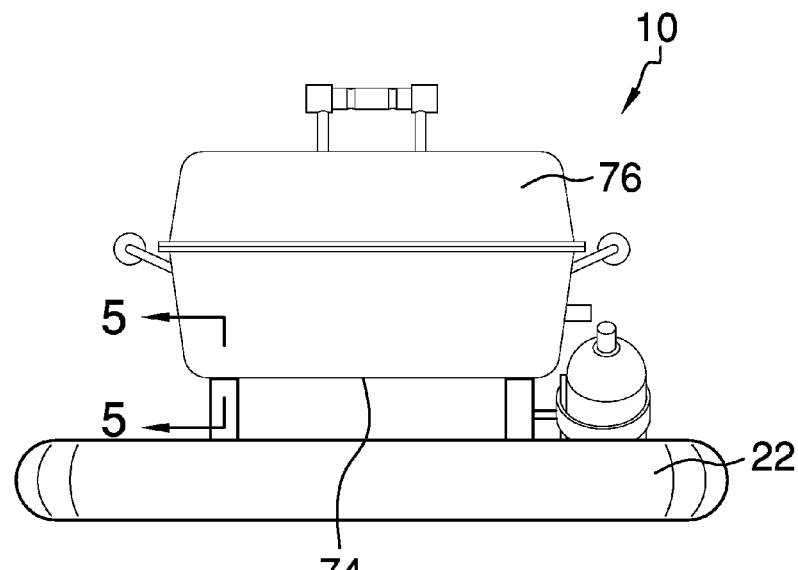
FIG. 3 is an in use view.
Figure 4:
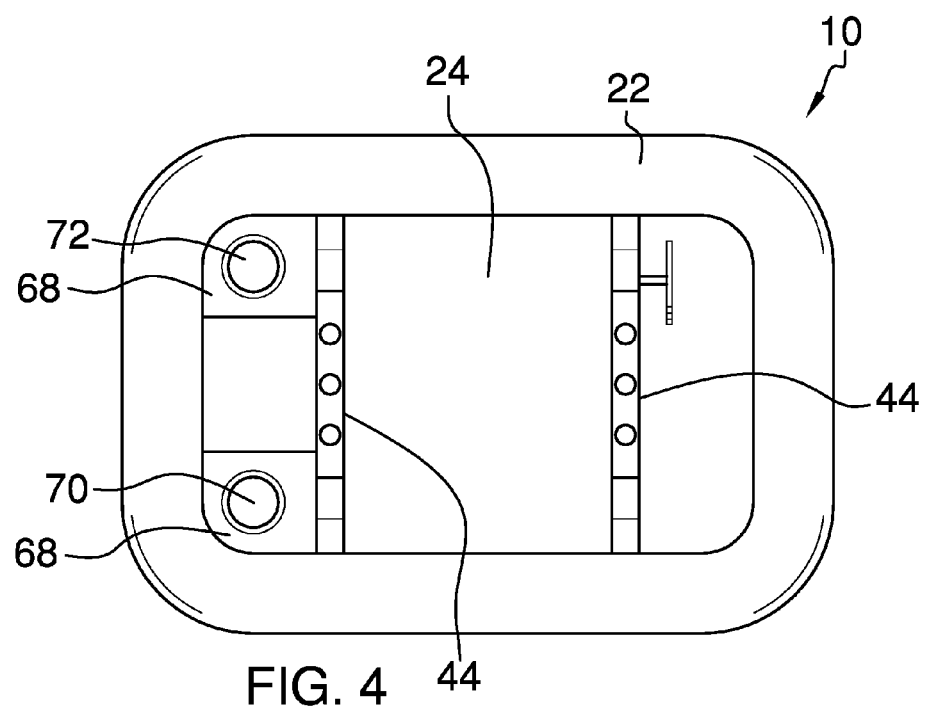
FIG. 4 is a top plan view.
Figure 5:
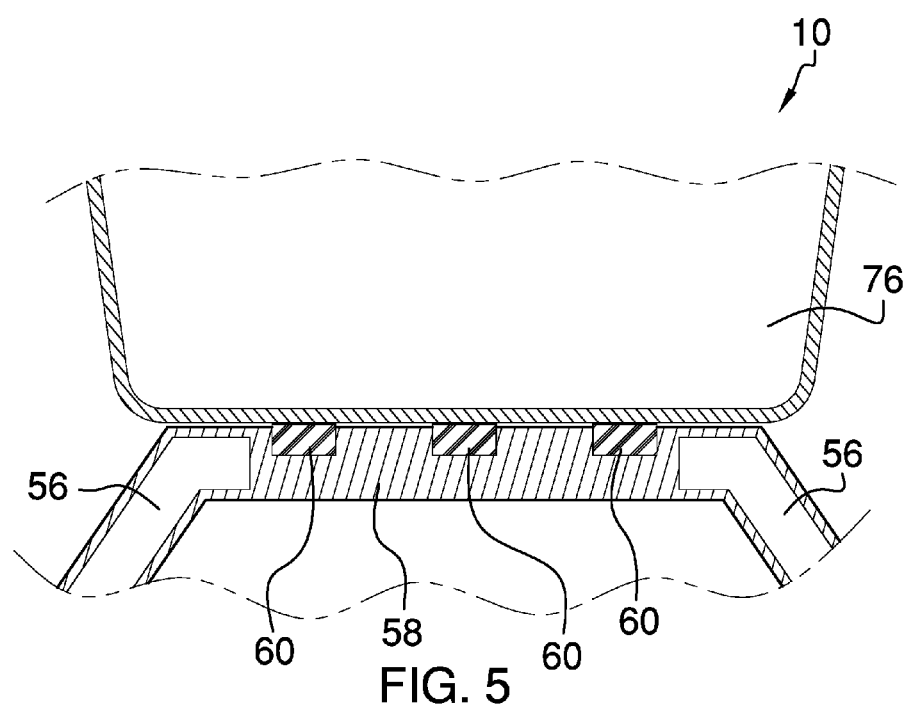
FIG. 5 is a cross-sectional view taken along line 5-5 of FIG. 3.

With reference now to the drawings, and in particular FIGS. 1 through 5 thereof, an example of the instant floating apparatus for supporting a grill employing the principles and concepts of the present floating apparatus for supporting a grill and generally designated by the reference number 10 will be described.

Referring to FIGS. 1 through 5 the present floating apparatus for supporting a grill 10 is illustrated. The floating apparatus for supporting a grill 10 includes a substantially rectangular float 20 having a continuous tubular outer rim 22, a substantially rectangular base 24 continuously disposed within the outer rim 22, and a cavity 26 disposed within the outer rim 22 above the base 24. The outer rim 22 has a front right corner portion 28, a front left corner portion 30, a back right corner portion 32, a back left corner portion 34, a front portion 36, a back portion 38, a right portion 40, and a left portion 42. A pair of grill supports 44 includes a right grill support 46 and a left grill support 48, with each of the right grill support 46 and the left grill support 48 having a linear base rod 50 and an inverted substantially U-shaped upper support 52 medially attached to a top surface 54 of the base rod 50. The base rod 50 of each of the right grill support 46 and the left grill support 48 is continuously disposed within the cavity 26 from the front portion 36 of the float 20 to the back portion 38 of the float 20 proximal the right portion 40 and the left portion 42, respectively. The upper support 52 of each of the right grill support 46 and the left grill support 48 has a pair of end segments 56 and a middle segment 58, with each of the pair of end segments 56 downwardly and diagonally extended from the middle segment 58.

The floating apparatus for supporting a grill 10 further includes a plurality of magnets 60 disposed within the middle segment 58 of the upper support 52 of each of the right grill support 46 and the left grill support 48. Additionally, at least one cup holder unit 62 has a substantially square platform 64 disposed within the cavity 26 of the float 20 and attached to at least one of the front right corner portion 28, the front left corner portion 30, the back right corner portion 32, and the back left corner portion 34, as well as a cup holder opening 66 substantially medially disposed within the platform 64. The at least one cup holder unit 62 is optionally a pair of cup holder units 68 including a front cup holder unit 70 and a back cup holder unit 72. The front cup holder unit 70 is disposed within the cavity 26 of the float 20 and attached to the front left corner portion 30, and the back cup holder unit 72 is disposed within the cavity 26 of the float 20 and attached to the back left corner portion 34.

A flattened bottom side 74 of a portable outdoor grill 76 is removably securable to the plurality of magnets 60 and removably disposed immediately atop the upper support 52 of each of the right grill support 46 and the left grill support 48.

What is claimed is:

1. A floating apparatus for supporting a grill comprising:
    a substantially rectangular float having a continuous tubular outer rim, a substantially rectangular base continuously disposed within the outer rim, and a cavity disposed within the outer rim above the base, wherein the outer rim has a front right corner portion, a front left corner portion, a back right corner portion, a back left corner portion, a front portion, a back portion, a right portion, and a left portion;
    wherein the float is a buoyant material;
    a pair of grill supports comprising a right grill support and a left grill support, each of the right grill support and the left grill support having a linear base rod and an inverted substantially U-shaped upper support medially attached to a top surface of the base rod, wherein the base rod of each of the right grill support and the left grill support is continuously disposed within the cavity from the front portion of the float to the back portion of the float proximal the right portion and the left portion, respectively, wherein the upper support of each of the right grill support and the left grill support has a pair of end segments and a middle segment, wherein each of the pair of end segments is downwardly and diagonally extended from the middle segment;
    a plurality of magnets disposed within the middle segment of the upper support of each of the right grill support and the left grill support; and
    at least one cup holder unit having a substantially square platform and a cup holder opening substantially medially disposed within the platform, wherein the platform is disposed within the cavity of the float and attached to at least one of the front right corner portion, the front left corner portion, the back right corner portion, and the back left corner portion;
    wherein a flattened bottom side of a portable outdoor grill is removably securable to the plurality of magnets and removably disposed immediately atop the upper support of each of the right grill support and the left grill support.

2. The floating apparatus for supporting a grill of claim 1 wherein the at least one cup holder unit is a pair of cup holder units comprising a front cup holder unit and a back cup holder unit, wherein the front cup holder unit is disposed within the cavity of the float and attached to the front left corner portion, and the back cup holder unit is disposed within the cavity of the float and attached to the back left corner portion.

3. The floating apparatus for supporting a grill of claim 2 wherein each of the pair of grill supports is steel.

* * * * *